United States Patent [19]
Kakinuma

[11] 4,213,152
[45] Jul. 15, 1980

[54] OUTPUT CIRCUIT FOR VIDEO TAPE RECORDER

[75] Inventor: Kazuaki Kakinuma, Katsuta, Japan

[73] Assignee: Hitachi, Ltd., Japan

[21] Appl. No.: 6,515

[22] Filed: Jan. 25, 1979

[30] Foreign Application Priority Data

Jan. 25, 1978 [JP] Japan ............................ 53-6800[U]

[51] Int. Cl.² .................... H04N 5/76; H04N 5/44
[52] U.S. Cl. .............................. 358/186; 358/127;
358/83; 332/2; 360/33; 455/120
[58] Field of Search .................... 358/1, 22, 127, 188,
358/141, 143; 360/29, 33; 332/31 R, 31 T, 2;
325/102, 105, 171, 172

[56] References Cited
U.S. PATENT DOCUMENTS 3,731,282  5/1973  Dancis et al. ...................... 358/127
3,775,554  11/1973  Hjortzberg ........................... 358/1
3,775,555  11/1973  Carlson .......................... 325/171 X
4,097,899  6/1978  Yu .................................. 360/33 X Primary Examiner—Benedict V. Safourek
Attorney, Agent, or Firm—Craig & Antonelli

[57]  ABSTRACT

An output circuit for converting a video signal reproduced from a video signal reproducing apparatus such as a video tape recorder, to a signal in the form of an RF signal in terms of a television channel carrier and selectively producing one of two channel carriers, comprises a first filter for eliminating the lower sideband wave of the lower one of the two channels, a second filter connected in series with the first filter for eliminating the lower sideband wave of the higher one of the two channels, and a switch for activating the second filter only when the higher channel is selected to produce the higher channel signal.

3 Claims, 3 Drawing Figures

OUTPUT CIRCUIT FOR VIDEO TAPE RECORDER

BACKGROUND OF THE INVENTION

The present invention relates to an output circuit for a video signal recording and reproducing apparatus such as a video tape recorder, and more particularly to a circuit for converting a signal reproduced from a recorded video signal to a signal in the form similar to a television broadcast wave.

In a video tape recorder or a video disk player or the like, a television receiver is commonly used to display a signal reproduced from a recording medium on which video signals have been recorded. Home-use television receivers are designed to receive the video signal in the form of modulated VHF or UHF carrier wave, and very few of them are provided with terminals to which the video signal can be directly applied. Accordingly, in the home-use video signal reproducing apparatus such as home-use video tape recorder, means for producing the reproduced output signal in the form of a modulated signal including a modulated VHF or UHF carrier wave, like the television broadcast wave, such as an RF converter is required. For a carrier frequency for the RF signal in the RF converter, two carrier frequencies of two adjacent television channels having successive frequencies are usually taken up, and one of them is selected by a user. As is well known, since the broadcast waves are not assigned to two channels having successive frequencies in a given area according to a channel plan for the television broadcast, the non-assigned vacant channel is utilized to supply the reproduced signal from the video tape recorder or the like to the television receiver so that the television receiver which receives the broadcast wave is not disturbed.

FIG. 1 shows a block diagram illustrating an example of a conventional RF converter. In FIG. 1, a video signal from the video signal reproducing apparatus such as video tape recorder is applied to a terminal 1. The video signal is then applied to a modulator circuit 2 where it is converted to a modulated signal capable of being received by a conventional television receiver. Numerals 3 and 4 denote carrier generator circuits which produce carrier waves of two adjacent television channels having successive channel frequencies. A user operates a switch 8 to select one of the carriers from the carrier generators 3 and 4 which is to be supplied to the modulator circuit 2. Assuming that the carrier generator circuits 3 and 4 produce the carrier frequencies $f_{r1}$ and $f_{r2}$, respectively, the output signal of the modulator circuit 2 has frequency spectra shown by A and B in FIG. 2. Since this signal has upper and lower sideband waves symmetrically around the carrier, it is necessary to eliminate the lower sideband wave by a filter so that the signal meets the vestigial sideband transmission system television broadcast standard. That is, for the carries $f_{r1}$ and $f_{r2}$, the bands of the output signals must be within frequency ranges $W_a$ and $W_b$, respectively, shown in FIG. 2. Filters 5 and 6 shown in FIG. 1 are bandpass filters for that purpose. The filter 5 functions to pass frequency band $W_a$ for one of the channels while the filter 6 functions to pass frequency channel band $W_b$ for the other channel. Switches 9 and 10 are ganged with the switch 8 so that the passband is selected in accordance with the carrier frequency selected. In this manner, the modulated signal capable of being received by the conventional television receiver is produced at a terminal 7.

In such a circuit arrangement, many switching circuits for the RF signal are necessary. Since the signal having frequency components in the VHF band or higher ones must pass through these switching circuits, it is necessary to use the switches designed to have excellent high frequency characteristics. Such switches are usually expensive and the use of these switches in great number results in the rise of cost. Therefore, such a circuit arrangement is undersirable for the home-use equipment.

SUMMARY OF THE INVENTION

It is an object of the present invention to provide a novel RF converter which constitutes an output stage of a video signal reproducing apparatus so that an output video signal of the video signal reproducing apparatus can be supplied to a conventional television receiver.

It is another object of the present invention to provide an output circuit of an RF converter which is inexpensive and has a simple construction.

It is a further object of the present invention to provide an RF converter having a filter of a simple construction for selectively passing one of the two television channels used.

In order to achieve the above objects, according to the present invention, band-elimination filters are provided for eliminating only lower sideband components of RF signals modulated by a video signal, at the output stage of a modulator circuit, and the function of that band-elimination filter which eliminates the lower sideband wave in a higher frequency channel is selectively activated or deactivated in accordance with the selection of the carrier frequency. Accordingly, only one switching circuit is necessary for the switching between the filters and hence the overall filter construction is simple and its production cost is low.

DESCRIPTION OF THE PREFERRED EMBODIMENTS

Figure 1:
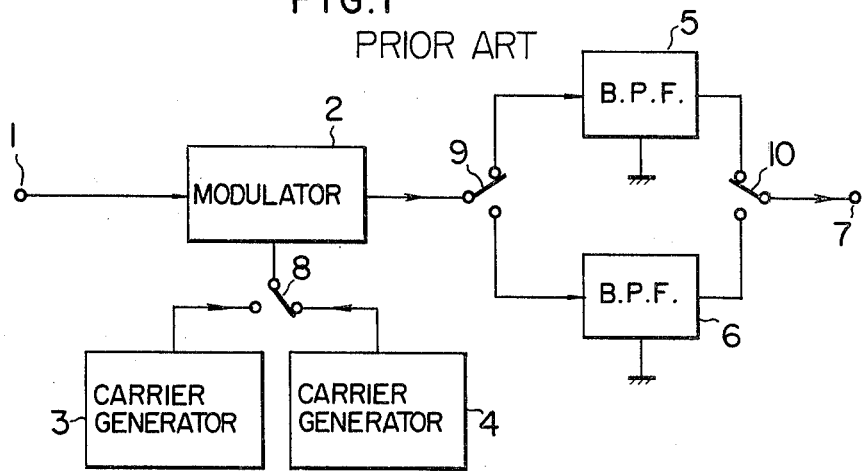
FIG. 1 is a block diagram showing one example of a prior art RF converter used for a video tape recorder.
Figure 2:
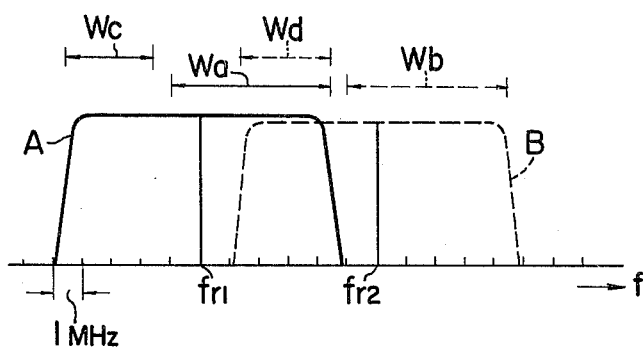
FIG. 2 shows frequency spectra of modulated signals.
Figure 3:
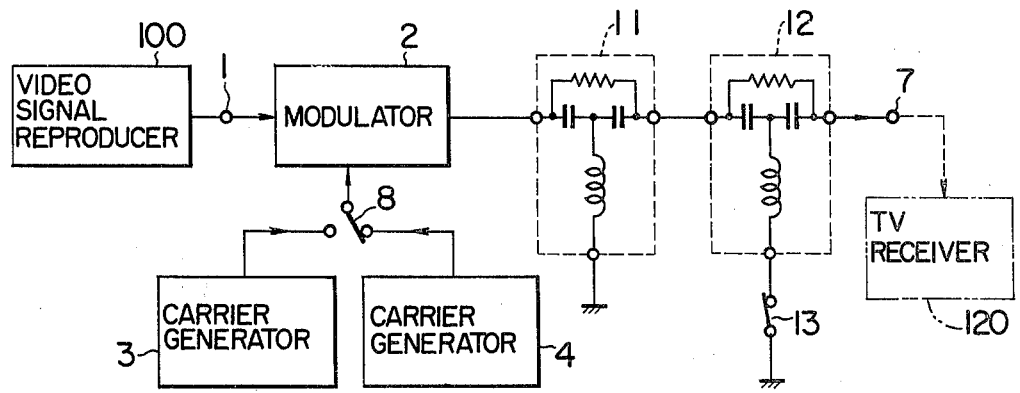
FIG. 3 is a block diagram showing one embodiment of an RF converter of the present invention.

FIG. 3 is a block diagram showing one embodiment of an RF converter of the present invention. Numeral 100 denotes a video signal reproducer such as a video tape recorder. A video signal reproduced by the video signal reproducer 100 is supplied to the terminal 1, thence to the modulator circuit 2, to which one of the carriers at frequencies $f_{r1}$ and $f_{r2}$ generated by the carrier generator circuits 3 and 4, which is selected by the switch 8, is supplied, and the supplied carrier is modulated with the video signal. The frequencies $f_{r1}$ and $f_{r2}$ are selected to be equal to carrier frequencies of two adjacent VHF or UHF television channels having successive frequencies. The carrier generator circuits 3 and 4 may be separately provided, or one common circuit having selectable resonance circuit constants such as of two alternatively operable crystal resonators may be used. The RF signal modulated with the video signal in the modulator circuit 2 has the frequency band A or B shown in FIG. 2.

As stated above, those two RF signals must occupy the same frequency bands as those of the television broadcast signals shown by $W_a$ and $W_b$ in FIG. 2. Accordingly, for the RF signals having the band A and B, bands $W_c$ and $W_d$, respectively, must be eliminated. In accordance with the present invention, this is attained by a first band-elimination filter 11 and a second band-elimination filter 12. The filter 11 is designed to always eliminate the band $W_c$ shown in FIG. 2. Thus, when the carrier frequency $f_{r1}$ is selected, the frequency band of the signal produced from the modulator circuit 2 is equal to the band A shown in FIG. 2, and the filter 11 eliminates the lower sideband wave thereof. When the carrier frequency $f_{r2}$ is selected, the frequency band of the output signal of the modulator circuit 2 is equal to the band B shown in FIG. 2. Accordingly, when the filter 11 is designed to eliminate the band $W_c$, the carrier frequency $f_{r2}$ lies outside the elimination band and hence the signal having the carrier frequency of $f_{r2}$ is not affected by the filter 11. Therefore, the filter 11 is constantly connected to the output of the modulator circuit 2.

When the carrier of the higher frequency channel, that is $f_{r2}$ is selected, it is necessary to eliminate the band $W_d$ shown in FIG. 2. To this end, a switch 13 is closed to activate the filter 12. The elimination band of the filter 12 when the switch 13 is closed is equal to the band $W_d$ shown in FIG. 2. As is apparent from FIG. 2, the band $W_d$ partially overlaps the frequency band to be passed when the lower frequency channel carrier $f_{r1}$ is selected. In this case, therefore, the switch 13 is opened to deactivate the filter 12. By designing the switch 13 so that it is ganged with the switch 8, it is possible to pass the necessary signal and eliminate the unnecessary sideband wave. When the switch 13 is opened to deactivate the filter 12, the passband is broadened, but this does not pose a serious problem because the band of the signal modulated by the video signal is inherently limited.

An additional band-pass filter for passing only the sum band of the bands A and B shown in FIG. 2 may be provided in a signal path from the output of the modulator circuit 2. The filter 11 is not limited to the band-elimination filter but it may be a high-pass filter which eliminates the band $W_c$ shown in FIG. 2 and passes the higher frequencies.

In this manner, the RF signal having one selected channel carrier is produced at the terminal 7, thence it is supplied to a television receiver 120 where the reproduced video signal is displayed.

According to the present invention, as is apparent from FIG. 3, only one switch is necessary for the switching between the filters and no switch is inserted in the RF signal path extending from the modulator circuit 2 to the output terminal 7. Therefore, the requirement for the performance of the switch is less severe than that to the prior art arrangement.

I claim:

1. An output circuit for a video signal reproducing apparatus which delivers a video signal acceptable to an RF input stage of a television receiver, comprising:
   means for selectively generating carriers corresponding to two adjacent television channels having successive frequencies;
   modulating means for modulating an output carrier from said carrier generating means with a video signal;
   a first filter connected to an output of said modulating means for eliminating the lower sideband wave of the signal of the lower frequency carrier modulated with the video signal; and
   a second filter connected in series with said first filter in an output path of said modulating means and adapted to be ganged with the selection of the carrier by said carrier generating means for eliminating the lower sideband wave of the signal of the higher frequency carrier when the higher frequency carrier is selected.

2. An output circuit for a video signal reproducing apparatus according to claim 1, wherein said first filter comprises a band-elimination filter for eliminating only the lower sideband wave of the lower one of the two channel RF signals generated.

3. An output circuit for a video signal reproducing apparatus according to claim 1, wherein said second filter comprises a band-elimination filter including an impedance element connected between a signal input/output path and the ground for selectively eliminating only the lower sideband wave of the higher one of the two channel RF signals, and a switch for on-off control of the connection between said impedance element and the ground.

* * * * *